United States Patent [19]

Gorby

[11] 4,079,800

[45] Mar. 21, 1978

[54] CONTROL APPARATUS FOR FRONT END LOADER

[75] Inventor: Oliver L. Gorby, Fargo, N. Dak.

[73] Assignee: Dynamic Industries Inc., Barnesville, Minn.

[21] Appl. No.: 703,813

[22] Filed: Jul. 9, 1976

[51] Int. Cl.² .................................................. B60K 20/14
[52] U.S. Cl. ................................ 180/77 R; 180/70 R; 180/66 R
[58] Field of Search ................. 180/66 R, 70 R, 77 R, 180/44 F; 60/492, 491; 74/474, 478

[56] References Cited

U.S. PATENT DOCUMENTS

| | | | |
|---|---|---|---|
| 3,401,522 | 9/1968 | Hann | 60/492 |
| 3,443,656 | 5/1969 | Stoby | 180/66 R |
| 3,508,401 | 4/1970 | Aplin | 60/492 X |
| 3,858,675 | 1/1975 | Geis | 74/478 X |
| 3,915,321 | 10/1975 | Gorby | 180/44 F X |
| 4,026,108 | 5/1977 | Pensa | 60/492 X |

Primary Examiner—Joseph F. Peters, Jr.
Assistant Examiner—Terrance L. Siemens
Attorney, Agent, or Firm—Robert E. Kleve

[57] ABSTRACT

The invention comprises a control apparatus for controlling the speed of the drive of a front end loader. The apparatus has a pair of hydrostatic motors for powering the input gear of the transfer case wherein the output gear of the transfer case drives the front and rear wheels of the loader. A control cylinder actuates a control mechanism to vary the speed of the two motors in sequence. A pair of foot pedals are provided to gradually actuate the pump to the two motors in opposite directions. The two foot pedals also actuate the control cylinder to actuate the two motors. Each foot pedal is depressable and during its initial depression action actuates the pump gradually in one direction or the other, and upon completion of the pump acceleration and any additional depression action actuates the control cylinder to actuate the two motors in sequence.

3 Claims, 7 Drawing Figures

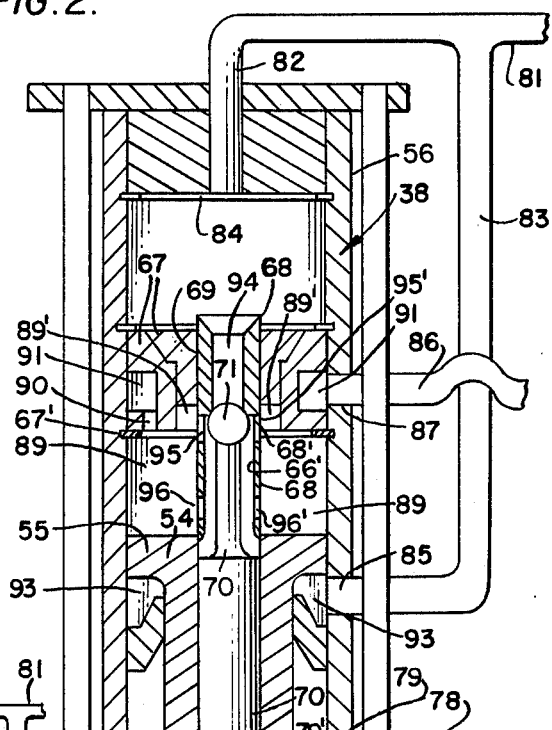
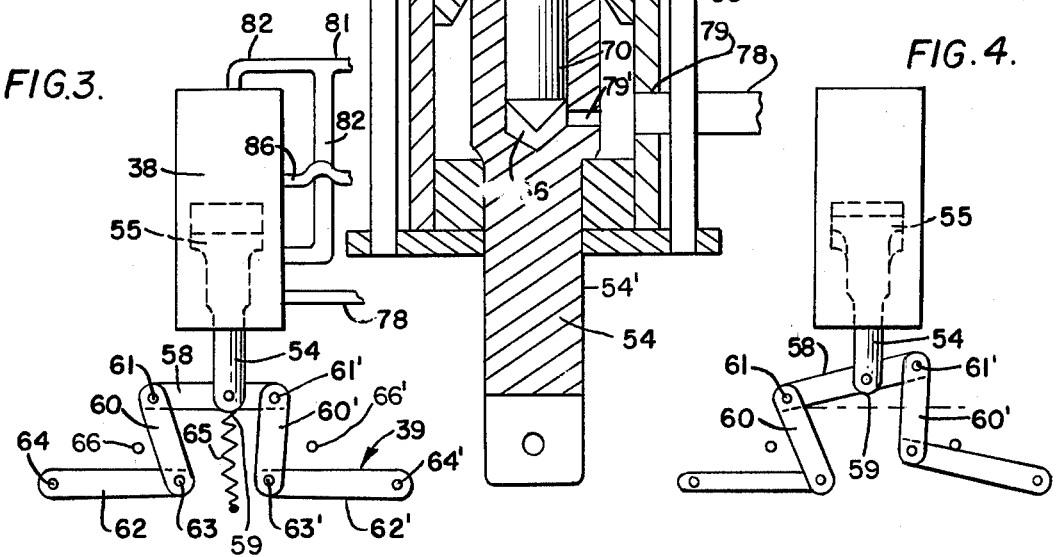
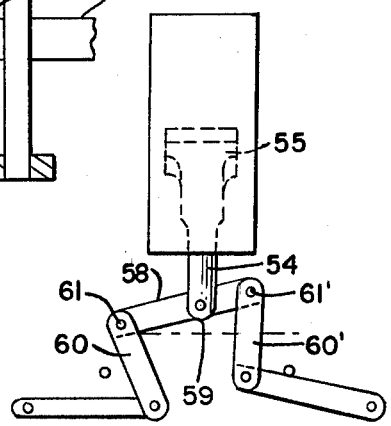
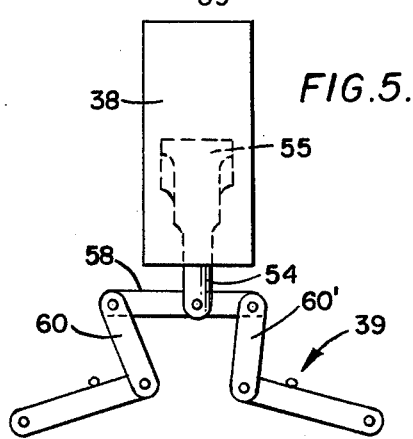

CONTROL APPARATUS FOR FRONT END LOADER

This invention relates to control aparatus for front end loaders, more particularly, the invention relates to apparatus for varying the speed of the loader within a wide range and with more precision.

It is an object of the invention to provide a novel control apparatus for a front end loader that enables the two hydrostatic drive motors of the loader for driving the loader to be regulated sequentially and functionally so as to provide improved operational characteristics.

It is another object of the invention to provide a novel control apparatus for a front end loader sequentially controlling the hydrostatic pump and the hydrostatic motor means which motor means drives the input gear to the transfer case of the drive to the wheels of the loader in a fixed sequence for a more accurate and efficient control of the speed and driving force of the input gear and resulting drive.

It is another object of the invention to provide a novel control apparatus for a front end loader having two foot pedals each controlling the hydrostatic pump and hydrostatic motor means to the input gear of the transfer case of the loader for varying the speed of the input gear by hydraulically varying the pump motor means swash plate to thereby vary the speed of the loader with varying oil volume in either direction.

It is another object of the invention to provide a novel control apparatus that utilizes the variance and control of the swash plate to act as a throttling device for the oil flow through it and resultantly through the second hydrostatic motor to vary and control the speed of the front end loader.

Further objects and advantages of the invention will become apparent as the description proceeds and when taken in conjunction with the accompanying drawing wherein:

FIG. 2 is an enlarged view of the hydraulic control cylinder for powering the mechanism for varying the speed of the two motors of the control apparatus to the input gear with a cutaway of the cylinder.

FIG. 3 is a side elevational view of the control cylinder and mechanism for power controlling the speed of the two motors.

FIG. 4 is a side elevational view of the control cylinder and mechanism illustrating the mechanism with one motor with a maximum swash plate angle and the other with a minimum angle.

FIG. 5 is a side elevational view of the control cylinder and mechanism illustrating the control cylinder and mechanism with the two motors at full speed.

Briefly stated, the invention comprises a control apparatus for controlling the speed of the drive of a front end loader comprising a transfer case having an input gear and an output gear driving the front and rear wheels of the loader, a pair of hydrostatic motors powering the input gear of the transfer case, a control cylinder and control mechanism for said motors, said control cylinders activating said control mechanism to vary the speed of the two motors in fixed sequence to vary the speed of the drive to the front and rear wheels of the loader vehicle, a pair of pivotally mounted foot pedals said foot pedals operated by being depressed, one foot pedal in its initial position of its depression stroke initiates and gradually activates a pump to the two motors in one direction and the other foot pedal during its initial portion of its depression stroke activates the pump to the two motors in the other direction to power the vehicle in the opposite direction, said foot pedals also have each a hydraulic cylinder activated by said foot pedal, each of said foot pedals after total activation of the pump, any further depression of said foot pedals immediately actuates hydraulic cylinders which in turn activate the control cylinder and said control mechanism to actuate said two motors in a fixed sequence, of first activating the one motor and then activating the other motor, providing more positive control of the speed of the drive and increased efficiency of the drive to the loader.

Figure 1:
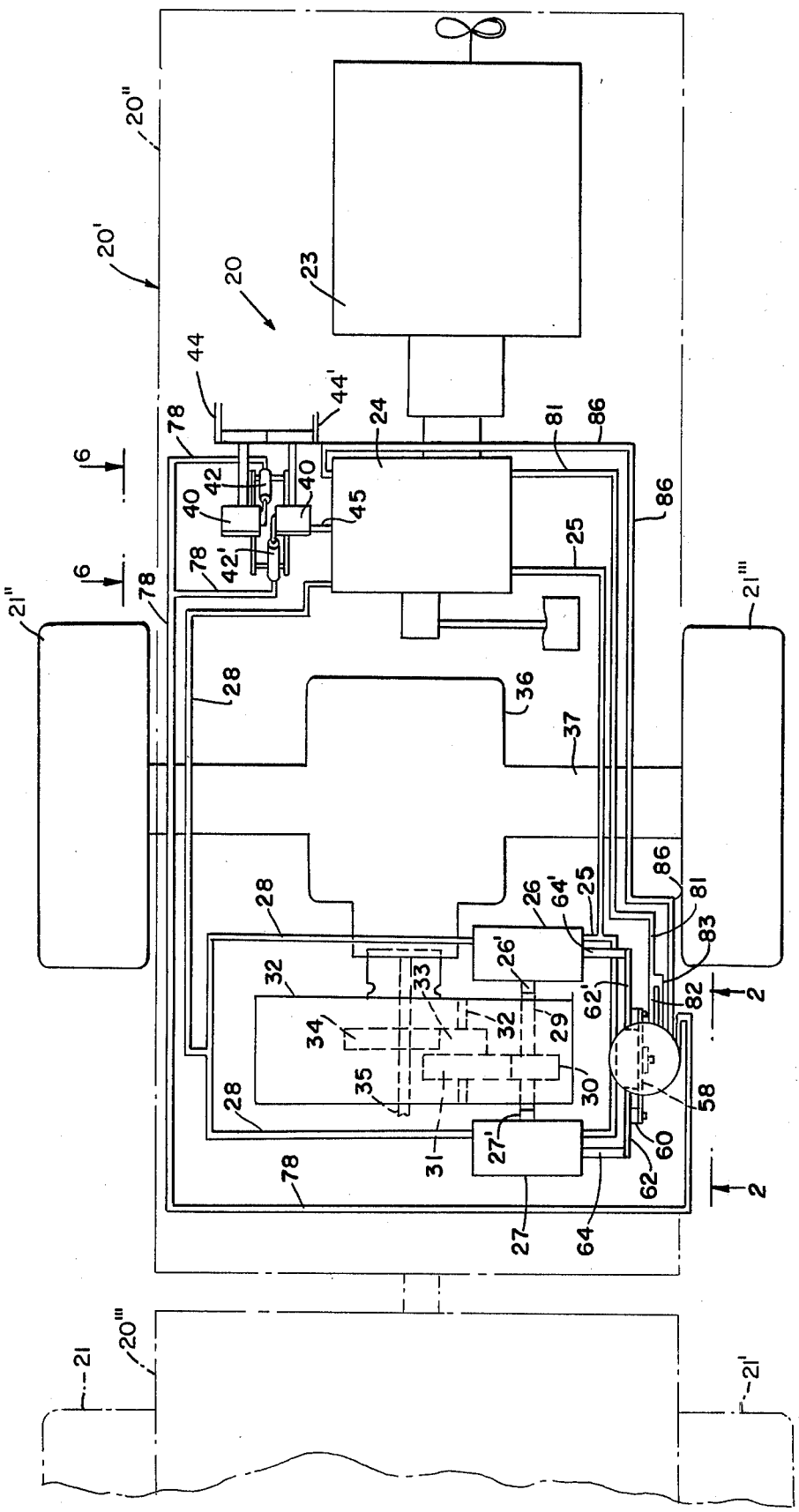
FIG. 1 is a schematic view of the control apparatus for controlling the two motors powering the input gear of the transfer case of the drive to the front and rear wheels of the loader and diagram of the hydraulic circuit system for the control apparatus.

Referring more particularly to the drawings in FIG. 1, the control apparatus 20 is shown mounted to a conventional loader 20' on the rear frame 20". The loader has a front frame 20''' with wheels 21, 21', 21", and 21'''. The rear frame 20" has a conventional engine 23 which drives a conventional hydrostatic pump 24. The hydrostatic pump pumps hydraulic fluid along hydraulic line 25 to the hydrostatic motors 26 and 27. The hydrostatic motors 26 and 27 have a return flow hydraulic line 28, which allows fluid to go back to the pump 23, then from the pump back to the motors again, which pump construction is well known in the art.

The hydrostatic motors 26 and 27 have each the output shaft portion 26' and 27' fixed to the shaft 29 of the input gear 30 of the transfer case 32 to rotate the input gear 30. A large gear 31 and a small gear 33 are non rotating mounted on a shaft 32 so as to rotate with the shaft 32 with the input gear 30 driving the large gear 31 on the center shaft 32 to rotate shaft 32. The center shaft 32 in being driven rotates the small gear 33 also fixed axially on the center shaft with the small gear 33 driving a large output gear 34. The output gear 34 is fixed coaxially to the output shaft 35 which provides power through an universal joint to the drive to the front wheels on the front frame of the loader in a conventional manner. The input shaft 35 at its other end is fixed coaxially to the input shaft of the rear differential 36 of the rear axle 37 of the rear frame to drive the rear wheels of the loader vehicle in a conventional manner.

The transfer case 32 and drive train to the front and rear wheels are also all conventional and well known in the art, such as shown in prior U.S. Pat. No. 3,915,321.

The improvement, including the two hydrostatic motors 26 and 27 driving the shaft of the input gear 30, has a hydraulic control cylinder 38. The hydraulic control cylinder 38 is fixed to the rear frame above the two motors 26 and 27.

The hydraulic control cylinder 38 controls the speed of the two motors 26 and 27 by a control mechanism 39.

The hydraulic control cylinder 38 is remotely controlled by actuation of either foot pedal 40 or by actuation of foot pedal 40'.

The foot pedal 40 in its initial downward movement gradually activates the pump 23 in one direction to pump fluid through line 25 to the motors 26 and 27 in one direction and along line 28 back to the pump 23. In the latter downward movement of pedal 40, its movement actuates hydraulic cylinder 42 which cylinder gradually actuates the control cylinder 38 and the control cylinder in turn gradually actuates the motors 26 and 27 in sequence to gradually actuate drive to the front and rear wheels of the loader in one direction.

The foot pedal 40' in its initial downward movement actuates the pump 23 in the opposite direction in relation to its activation by pedal 40 to pump fluid through the motors 26 and 27 in the opposite direction along line 28 through motors 26 and 27 and along line 25 back to the pump 23.

The latter downward movement of pedal 40' actuates the hydraulic cylinder 42', which cylinder gradually activates the control cylinder 38 and the control cylinder in turn gradually activates the motors 26 and 27 to gradually accelerate the power to the front and rear wheels of the loader in the opposite direction. The term acceleration is meant to refer to the increase in acceleration as caused by the depressing of the foot pedal.

Foot Pedals

The foot pedals 40 and 40' are each individually pivotally mounted on a shaft 43 and the shaft 43 has brackets 44 and 44' fixing the shaft 43 to the rear frame of the vehicle above the pump 24.

The hydrostatic pump 24 has a control shaft 45. The rotation of the control shaft actuates the pump in one direction and the rotation of the shaft 45 in the opposite direction actuates the pump in the opposite direction.

A pair of plates 46 and 46' are fixed to a lever or shaft outer portion 45' which in turn is fixed to the outer end of the control shaft 45 of the pump 24. A pair of hydraulic cylinders 42 and 42' have their cylinder portions 47 and 47' pivotally mounted to the side plates at pivot points 48 and 48'. The cylinder portions 47 and 47' each has shaft portions 49 and 49' fixed to the outer surfaces of the cylinder portions with the shaft portions in coaxial relation and extending outward and with these shaft portions pivotally mounted in bores in the side plates 46 and 46' of pivot points 48 and 48' to provide the pivotal mounting.

The pedals have brackets 50 and 50' fixed to the rod portions of the pedals and the ends 51 and 51' of the pistons 52 and 52' and of the cylinders 42 and 42' are pivotally mounted to the brackets 50 and 50' of the pedals to pivotally mount the pistons of the cylinders 52 and 52' to the pedals 40 and 40', respectively.

Figure 6:
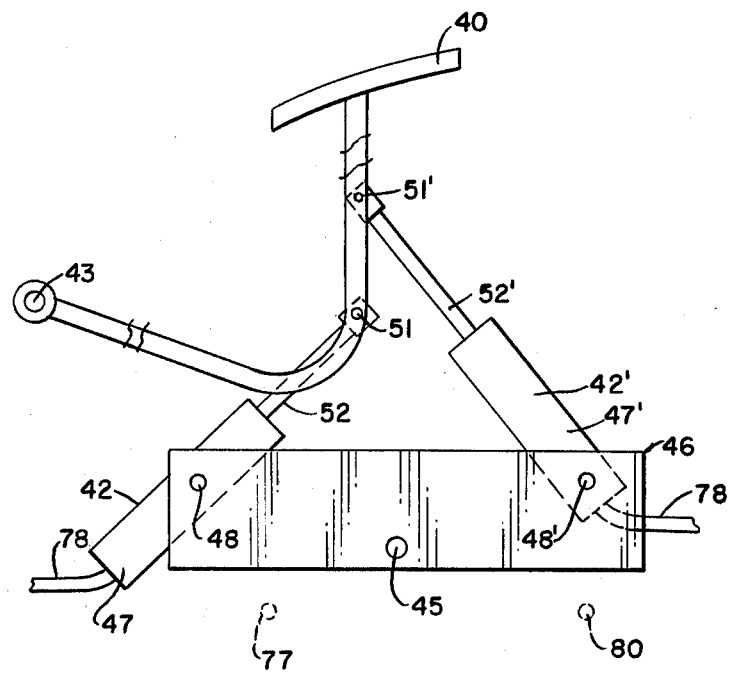
FIG. 6 is an enlarged side elevational view of the two foot pedals and their hydraulic cylinders individually activated by each pedal, with the hydraulic cylinders acting to activate the control cylinder for activating the mechanism to control the two motors, taken along line 6—6 of FIG. 1.

The pivoting of the plates 46 and 46' in one direction from its horizontal position shown in FIG. 6 by depressing one of the pedals rotates the control shaft to the pump gradually activating the pump in one direction. The pivoting of the plates 46 and 46' in the opposite direction from its position shown in FIG. 6 by depressing the other pedal gradually activates the pump to pump in the opposite direction.

Control Cylinder and Mechanism

The control cylinder 38 and mechanism is remotely controlled by activation of either foot pedal 40 or foot pedal 40'.

The control cylinder 38 inturn controls the speed of the motors 26 and 27 by the control mechanism 39.

The hydraulic control cylinder 38 has a piston 54. The piston 54 has a piston rod 55' and plunger 55 fixed to the top of the piston rod portion 55'. The piston 54 moves up and down in the cylinder portion 56. The lower end 57 of the piston 54 is pivotally mounted to a lateral plate 58 of the control mechanism at pivot point 59. The outer ends of the lateral plate 58 are pivotally mounted to a pair of linkage plates 60 and 60' at pivot points 61 and 61'. The linkage plates 60 and 60' are pivotally mounted to a pair of arms 62 and 62' at pivot points 63 and 63'. The arms 62 and 62' are fixed laterally to the outer ends of the control shafts 64 and 64' of motors 25 and 26.

A spring 65 is connected to the lower end of the piston at one end and at its other end connected to the rear frame to urge the piston downward.

It is intended that the full stroke of the piston be from its position shown in solid lines in FIG. 5, upward relative to the cylinder position until the upper edges of the plunger 55 of piston 54 engages the annular ring seal 67'.

The piston has a hollow sleeve 68 fixed to the top of the piston 54 that slides up and down with the piston 54 in a bore 69 of collar 67. A center pin 70 is slidably mounted in the hollow sleeve. A ball 71 rests on top of the center pin 70 and is raised up and down by the center pin 70 raising up and down in the sleeve of the piston, relative to the piston.

Operation

The depressing of pedal 40 pivots the plates 46 and 46' and shaft 45 counterclockwise about the axis of shaft 45 causing the other pedal 40' to raise. The initial depressing of the foot pedal 40 does not activate the cylinder 38 as the plates 46 and 46' but merely pivots with the pedal. When the plates 46 and 46', in pivoting, reach the point 77, the movement of the plates counterclockwise stops when the control shaft 45 reaches this point in counterclockwise relation the shaft 45 reaches and engages a limiting stop inside the pump 24.

However, the initial depressing of the pedal 40 before the pedal engages the pin 77 does rotate the control shaft 45 to the pump counterclockwise which gradually accelerates the oil flow from the pump in one direction.

The continued downward depressing of pedal 40 after the counterclockwise movement of the plates 46 and 46' has stopped by the plates reaching point 77, compresses the piston 52 of cylinder 42 downward into the cylinder portion 47 to activate the control cylinder 38 by pumping hydraulic fluid along line 78 into port 79 into cylinder 38.

The depressing of pedal 40' pivots the plates 46 and 46' and shaft 45 clockwise about the axis of shaft 45, causing the pedal 40 to rise. The initial depressing of the foot pedal 40' does not activate the cylinder 38 as the plates 46 and 46' merely pivot with the pedal. When the plates 46 and 46', in pivoting, reaches the point 80. The movement of the plates clockwise stops as when the control shaft 45 reaches this point in clockwise rotation, the shaft reaches and engages a limiting stop inside the pump 23.

However, the initial depressing of pedal 40' before the plates 46 and 46' reaches point 80 does rotate the control shaft clockwise which gradually accelerates the pump in the opposite direction to its direction of pumping in connection with pedal 40.

The continued downward depressing of pedal 40', after the clockwise movement of plates 46 and 46' has stopped by the plates reaching point 80, compresses the piston 52' downward of cylinder 42 into the cylinder portion to activate the control cylinder 38 by pumping hydraulic fluid along line 78 into port 79 into cylinder 38.

The actuation of the control cylinder 38 is caused by the continued depressing of either pedal 40 or 40', after the plates 46 and 46' have reached either point 77 or 80, is caused by the compressing of either piston 52 or piston 52' thereby pumping fluid along line 28 into port 79 of the cylinder 38 into the bore 66 and pushing the center pin 70 upward in the sleeve of the piston 54 with the upward movement of the pin pushing the ball 71 upward closing the sleeve 68 at the lower end 68'.

The control cylinder 38 receives a constant charge of hydraulic fluid under pressure from the pump along line 81 into both lines 82 and 83 into ports 84 and 85 of the control cylinder. The control cylinder also has a return flow line 86 connected to the control cylinder at port 87. The outlet port 87 can receive fluid from either the lower end 68' of the sleeve 68 or it can receive fluid from within the chamber 89, which fluid in chamber 89 can travel out of port 90 into the annular space 91 and out of port 87.

Consequently, the upward movement of the ball 71 closes the sleeve 68 at the lower end. This stops any further flow of fluid into the cylinder through port 84. However, the oil is still under pressure in the line 81, and the oil under pressure can still travel along lines 81 and 83 into the control cylinder through port 85 into the annular space 93 and push against the piston plunger 55 and push the piston 54 upward while oil in the chamber 89 above the piston can travel out of space 89 through port 90 into the annular space 91 and out port 87.

This oil in the space 89 above the piston can travel out as the piston is pushed upward so long as either pedals 40 or 40' are continued to be pressed downward.

When the downward pressure on either pedal is stopped, the oil coming through port 79 will only hold the ball against the upper end of the sleeve 68, so long as the piston does not move upward any further. If the piston moves upward any further, the ball will drop down from the lower edge 68' of the sleeve. This allows oil to travel from port 84 into the bore 94 of sleeve 68 and into the annular space 66' between the ball and inside surface of the sleeve 68 and out either ports 95 and 95' or 96 and 96'. From there oil can travel into the annular space 89 and 89' into port 90 into the space 91 and out port 86. In relieving pressure along line 81 into port 84 and equalizes the upward pressure against the piston through port 85 so that there is no longer additional upward pressure against the piston.

Thus, if the foot pedal is held stationary, the ball will drop down and relieve any additional pressure into the piston through port 93, if the piston moves up slightly by the ball allowing just enough oil to leak out of the bottom of the sleeve 68 to equalize the pressure so that only enough oil is going back to the tank to keep the piston stationary.

When the foot pressure on the pedal is released, the oil will travel back into the cylinder, causing the ball to drop down entirely and all the oil can travel along line 81 into port 84 and down through the sleeve into the annular space and out port 91 back into the tank. This releases all oil pressure into port 85 so that there is no longer any pressure against the piston in space 93.

Since all the pressure is released against the piston, the spring 65 can now pull the piston back down to its position shown in FIGS. 2 and 3.

The fluid from the cylinders 42 and 42' of foot pedals can only travel from the cylinders 42 and 42' along line 78 into port 79 into cylinder 38 and into bore 79 and 60 and back into the cylinder 42 and 42'. There is no other exit for the fluid in the center bore from the cylinder except through port 79 and no other exit from cylinders 42 and 42' except along line 78. Consequently, the depressing of either pedal 40 and 40' will pump fluid into the cylinder 38 through port 79 into port 79' into the center bore 66 and push the rod 70 upward which pushes the ball 71 upward.

The raising of depressed pedals 40 and 40' will allow the piston of their respective cylinders to telescope back out thereby allowing fluid to travel back out of port 79 along line 78 and back into the cylinder thereby allowing fluid to travel back into the respective cylinder, relieving the fluid pressure in the center bore causing the rod to slide back downward again which causes the ball to move downward again to the position shown in FIG. 2.

Thus, either foot pedal can control the upward movement of the piston of the control cylinder and the downward movement of the piston of the control cylinder and the upward movement of the piston will gradually activate motor 26 first and then gradually actuate motor 27.

The control cylinder 38 in the raising of its piston 39 upward will pivot the lever arm 60' and 62' upward first because the pivot point 61' is closer to pivot 59 on the piston. This gradually actuates motor 26 first. The piston will continue to rise as the pedal continues to be depressed until the linkage 60' engages pin 66', which places the motor 26 control arm 62' in fully opened position, as shown in FIG. 6.

Figure 7:
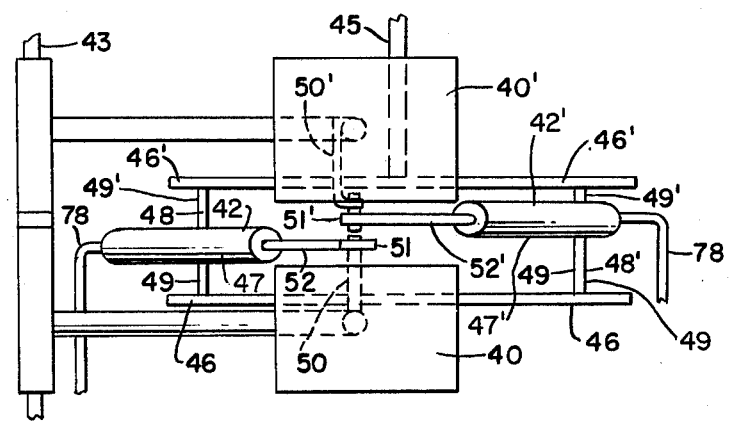
FIG. 7 is an enlarged top plan view of the foot pedals and mechanism and their hydraulic cylinders activated by the foot pedals.

Once the lever arm has engaged pin 63 if the operator continues to press down on the first foot pedal, the piston will continue to rise causing the other lever arm 60 and 62 to be pivoted upward gradually. If the operator keeps pressing the foot pedal downward, the piston will continue to rise until the lever arm 60 engages pin 66. This pivoting of lever arm 60 upward acts to gradually increase the speed of motor 26. Thus, when lever arm 60 engages pin 64 both motors 26 and 27 will be at the full speed, as shown in FIG. 7.

In both the pump and the two hydrostatic motors, the speed is regulated by the movement of the swash plates of the pump and motors.

The rotation of the control arm 45 of the pump in one direction rotates by rotating the plates 46 and 46' changes the position of the swash plate of the pump thereby accelerates the flow of fluid being pumped through the pump in one direction. When the control arm reaches the limiting stop at point 77, the pump is fully accelerated. The rotation of the control arm of the pump in the opposite direction rotates and changes the position of the swash plate of the pump to accelerate the flow of fluid being pumped through the pump in the opposite direction. When the control arm reaches the limiting stop at point 80, the pump is fully accelerated in the opposite direction.

Each of the motors 26 and 27 is accelerated by rotating the control arms 64 and 64' to change the postion of the swash plate of the motors from full stroke to half stroke.

Also by means of the novel foot pedal construction, upon completion of the acceleration of the pump during the initial pivoting of the plates, there is no time delay in initiating the acceleration of the motors. Since immediately upon completion of the acceleration of the pump in one direction or the other, when the plates stop their pivoting movement by engaging the limiting stop the pedal immediately begins compressing the pistons 52 or 52' to begin immediate actuation of one of the cylinders to raise the piston 54 which immediately begins actuation and acceleration of the motors 26 and 27 by changing the position of the swash plates of the motors.

Thus, the initial gradual depressing of pedal 40 acts to actuate the pump gradually in one direction, and the initial gradual depressing of pedal 40' acts to gradually actuate the pump in the opposite direction and the continued gradual depressing of either pedal 40 or 40' then immediately compresses either piston 52 or 52' into either cylinder 42 or 42' to gradually actuate the control cylinder to move the piston of the control cylinder upward, and the movement of the piston of the control cylinder upward acts to gradually open up the two motors 26 and 27 by actuating motor 26 first and motor 27 second in sequence to thereby gradually speed up the vehicle in one direction or the other.

The hydrostatic pump 23 is a conventional type which provides a reversable flow of fluid to the motors 26 and 27 and which also has a conventional outlet providing a constant charge of fluid. The outlet is connected to line 81, so that the pump can also simultaneously pump a constant flow of fluid in the same direction along line 81 into the control cylinder. Also, the hydrostatic pump 23 has a conventional internal spring construction to return the control arm 45 to its intermediate horizontal position after the pivoting of the arm in either direction by depressing either one of the pedals.

It will be obvious that various changes the departures may be made to the invention without departing from the spirit and scope thereof and accordingly, it is not intended that the invention be limited to that specifically described in the specification or as illustrated in the drawing, but only as set forth in the appended claims wherein.

What is claimed is:

1. A control apparatus for controlling the speed and direction of the drive of a front end loader, having a transfer case with an input gear and an output gear with the output gear driving the front and rear wheels of the loader, said apparatus comprising a pair of hydrostatic motors for powering the input gear of the transfer case, a control cylinder, a control mechanism connected between the control cylinder and the two motors whereby actuation of the control cylinder actuates the two motors in a gradual sequence, a pair of foot pedals, a reversible pump for powering the two motors in one direction or an opposite direction, one of said foot pedals during the initial downward stroke having means to actuate the pump in one direction, the other of said foot pedals during its initial downward stroke having means to actuate the pump in the opposite direction, both of said foot pedals during their later downward stroke having means immediately upon completion of the actuation of the pump to actuate the control cylinder to actuate the two motors in sequence.

2. A control apparatus for controlling the speed and direction of the drive of a front end loader, having a transfer case with an input gear and an output gear with the output gear driving the front and rear wheels of the loader, said apparatus comprising a pair of hydrostatic motors for powering the input gear of the transfer case, a control cylinder, a mechanism connected between the control cylinder and the two motors whereby actuation of the control cylinder actuates the two motors in a fixed sequence, a pair of foot pedals, a reversible pump for powering the two motors in one direction or an opposite direction, a control mechanism for said foot pedal comprising one of said foot pedals during the initial stroke movement having means to actuate the pump in one direction, said control mechanism further comprising the other of said foot pedals during its initial stroke movement having means to actuate the pump in the opposite direction and both of said foot pedals during their later stroke movement having means to actuate the control cylinder to actuate the two motors in sequence.

3. A control apparatus according to claim 2 wherein said control mechanism is comprising plate means pivotally mounted to said loader to pivot in one direction by the initial movement of said one pedal to actuate said pump in one direction and pivotally mounted to pivot in the opposite direction by the initial movement of said other pedal to actuate said pump in the opposite direction, a control actuation cylinder is mounted to said plate means beneath each foot pedal connected to each foot pedal to be actuated by the respective foot pedal in the later movement of the foot pedal providing said means to activate the control cylinder which activates said motors in said fixed sequence.

* * * * *